United States Patent [19]

Jahnle et al.

[11] 4,290,235
[45] Sep. 22, 1981

[54] INTRUSION RESISTING STRAP FOR AUTOMOBILE DOORS

[75] Inventors: Herbert A. Jahnle, Havertown, Pa.; Richard B. Freeman, Wilmington, Del.

[73] Assignee: The Budd Company, Troy, Mich.

[21] Appl. No.: 87,869

[22] Filed: Oct. 24, 1979

[51] Int. Cl.³ .............................................. B60J 5/04
[52] U.S. Cl. .......................................... 49/502; 49/9; 296/188; 296/189
[58] Field of Search ....................... 296/188, 189, 146; 188/1 C; 49/9, 34, 502

[56] References Cited

U.S. PATENT DOCUMENTS

| | | | |
|---|---|---|---|
| 2,826,788 | 3/1958 | Graham | 49/34 X |
| 3,717,223 | 2/1973 | Alfes | 188/1 C |
| 3,868,141 | 2/1975 | Johnson | 296/189 |

Primary Examiner—Kenneth Downey
Attorney, Agent, or Firm—A. L. Trueax, Jr.

[57] ABSTRACT

A band comprising continuous glass fibers provides intrusion resistance for a plastic door mounted between two vertical posts in an automobile. The continuous fibers of the band are disposed horizontally and may be separate from the door or form an integral part thereof.

8 Claims, 6 Drawing Figures

INTRUSION RESISTING STRAP FOR AUTOMOBILE DOORS

BACKGROUND OF INVENTION

In order to provide safety to drivers and passengers in automobiles, an important consideration is resistance to side impacts, especially at the door areas. In order to provide intrusion resistance in the past, steel beams or other metal framing were connected to doors to provide the necessary impact resistance.

With the emphasis on gasoline savings, automobiles have been made lighter by the replacement of plastic parts for many of the metal parts. Plastic parts, per se, are generally weaker than their corresponding metal parts. Despite the use of plastic parts, the safety standards especially those relating to doors and their resistance to intrusion upon impact, have not been relaxed.

To establish standards, it is generally necessary to measure the distances of intrusions or penetration of a door for certain levels of force. For example, the standard may limit the degree of penetration or intrusion of an automobile door to six inches when an average load of 2250 pounds is applied. Likewise, the intrusion distance may be limited to twelve inches when an average force of 3500 is applied. A maximum force of 7000 pounds or two times the automobile weight, must be reached within the first eighteen inches of penetration. Of course these standards are variable. The desired result is to achieve the maximum practical safety against intrusion while at the same time, making the doors relatively light in weight.

Molded plastic doors used heretofore have included chopped glass fibers approximately one inch long. Such materials used heretofore have little elongation or toughness and have low strength.

OBJECTS OF INVENTION

It is an object of this invention to provide an improved automotive door having reduced weight and acceptable intrusion resistance in the event of a side collision.

It is a further object of this invention to provide an improved lightweight automotive door which may be used in place of metal beams to prevent intrusions in the event of a side collision.

It is still a further object of this invention to provide an improved automotive plastic door which includes means for controlling the intrusion force-distance curve in the event of a side collision.

It is still a further object of this invention to provide an improved lightweight intrusion strap to replace metal beams in an automotive door which is relatively light in weight.

It is still a further object of this invention to provide an improved intrusion resistance strap for an automotive door in which the space requirements are minimized and permits reduced car width while maintaining interior width dimensions.

It is still a further object of this invention to provide a reinforced outer panel for an automotive door in which the cost of manufacturing is minimized.

SUMMARY OF INVENTION

In accordance with the present invention, an outer panel for an automobile door is provided for attachment between two vertical posts of the automobile body. The outer panel is made of plastic including resin material and chopped glass fibers. A band of continuous glass fibers as a separate element or integral with the panel is provided. In the event of impact, the strap curves and resists intrusion forces as it penetrates into the interior of the automobile.

Other objects and advantages of the subject invention will be apparent and suggest themselves to those skilled in the art from a reading of the following specification and claims, taken in conjunction with the accompanying drawings.

DESCRIPTION OF INVENTION

Figure 1:
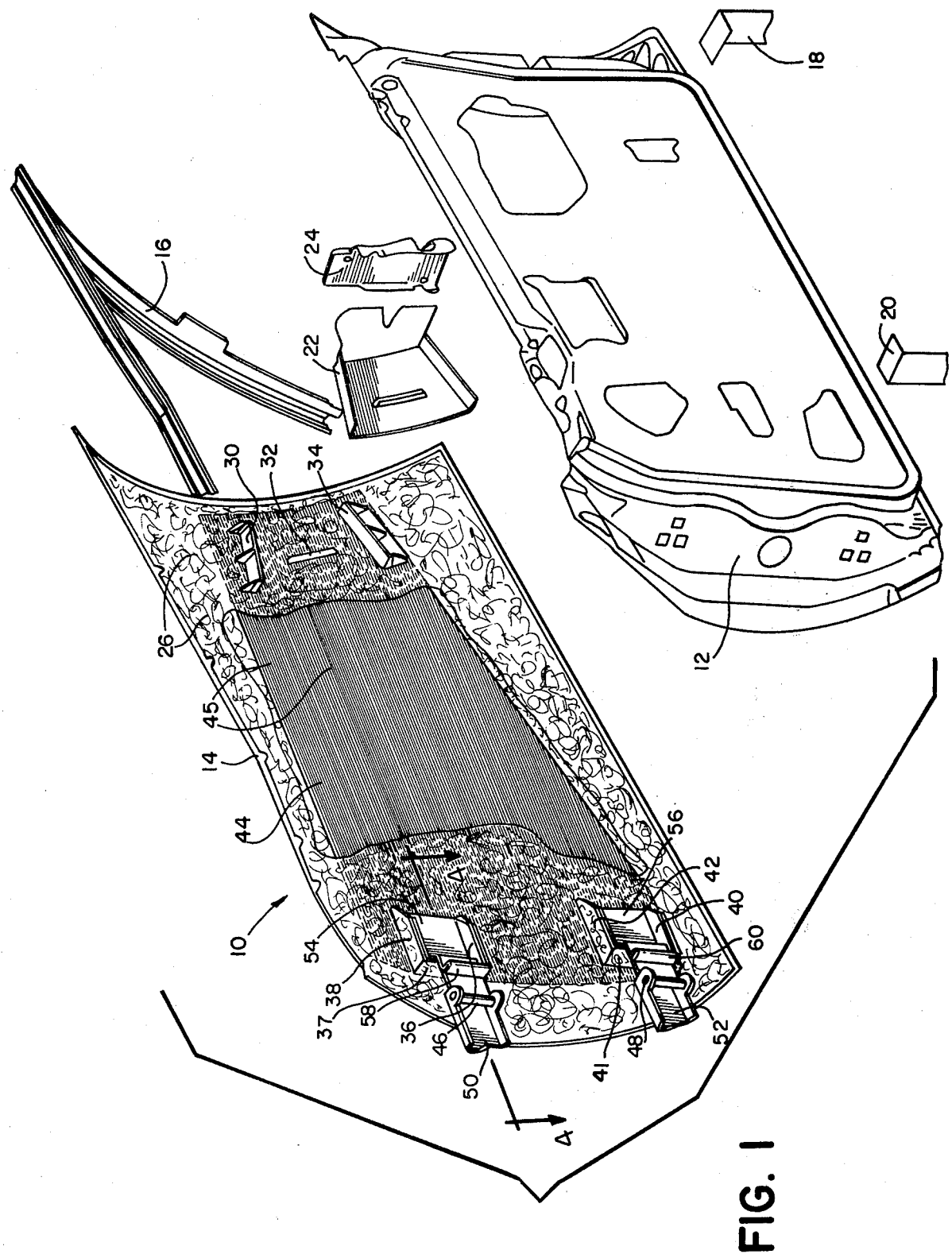
FIG. 1 is an exploded view of an automobile door including a plastic outer panel, in accordance with the present invention.

Referring particularly to FIG. 1, a door 10 comprises an inner panel 12 and an outer panel 14. The inner panel 12 is shaped and includes carious cut-outs to accommodate the window mechanism and various handles relating thereto. Because these features are not related to the present invention, they are not illustrated in detail. An upper frame 16 for the window of the door is also illustrated but is not related to the present invention.

The present invention is directed to the outer panel 14. The door 10 is disposed to be placed between two posts 18 and 20 in the body of an automobile. These posts are commonly referred to as "A" and "B" posts. The outer panel 14 is adapted to be secured to the inner panel 12 by any suitable means such as by adhesive or by riveting. Connecting elements 22 and 24 are adapted to fit into the latching mechanism of the door 12. The element 22 is adapted to be fitted within fittings in the outer panel 14, as will be described.

The outer panel 14 comprises plastic material the main body of which comprises chopped glass fibers 26 in a suitable resin material. As is well known, the resin is used primarily for maintaining the glass fibers in location and may comprise a number of different types of materials, such as unsaturated polyesters, vinylesters or epoxies. In molding the outer panel 14, various connecting elements may also be molded therewith. These elements may include plastic extensions 30, 32 and 34 which are adapted to receive the element 22 when the outer panel is connected to the inner panel. As mentioned, the connections may be made by any suitable means, such as by the use of adhesive. In addition, extensions 36, 37, 38 and 40, 41, 42 may also be molded along with the outer panel. These extensions provide means for receiving brackets which are connected to the hinge elements.

An important feature of the present invention involves the outer panel 14 which includes a band of fibers forming a strap 44. The strap comprises continuous glass fibers 45 loaded in tension and forms part of the molding of the door panel 14. The strap 44 stretches from the hinges to the latch of the door. The continuous glass fibers are unidirectional and have very high strength and essentially zero elongation.

Hinges 46 and 48 include connection strips 50 and 52, which are fixed to the post 20 of the body of the automobile. The other end of the hinge 46 includes a bracket 54 disposed to fit between the extensions 36, 37 and 38. The other end of hinge 48 includes a bracket 56 disposed to fit between the extensions 40, 41 and 42. The brackets 54 and 56 are secured to the inner panel by adhesive or other suitable means.

A metal strip 58 is connected between the pivotable section of the hinge 46 and the bracket 54. In like manner, a metal strip 60 is connected between the pivotable section of the hinge 48 and the bracket 56. The strips 58 and 60 have folded-over portions and are adapted to unfold or deform when the applied intrusion force is reacted from opposite ends of the folded portions.

Figure 2:
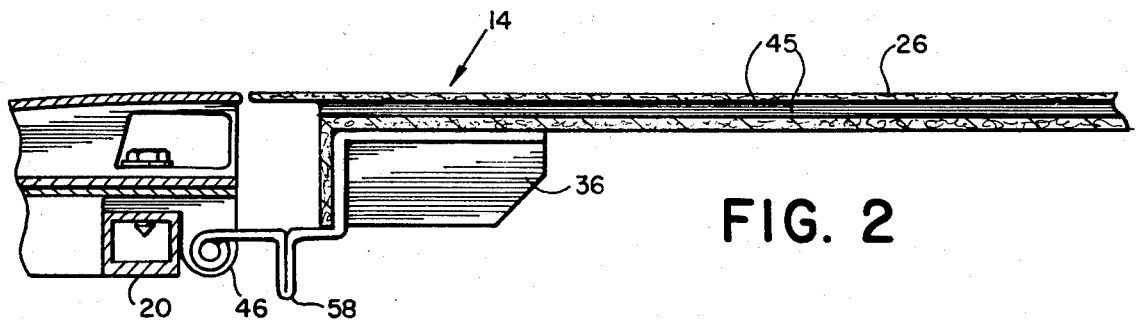
FIG. 2 is an enlarged cross-sectional section taken along lines 4—4 of FIG. 1.
Figure 3:
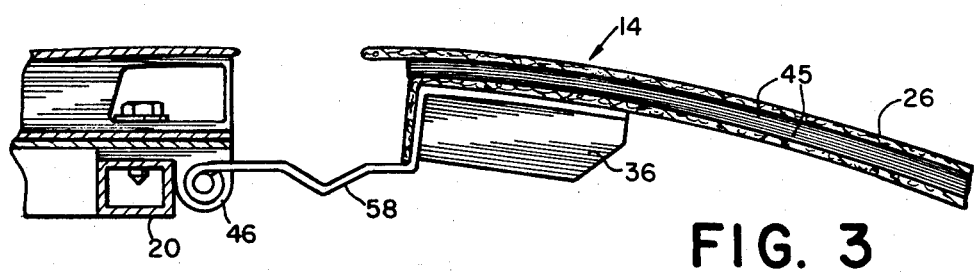
FIG. 3 is a view similar to FIG. 2 illustrating a reaction of the outer door panel when it is subjected to an intrusion force.
Figure 4:
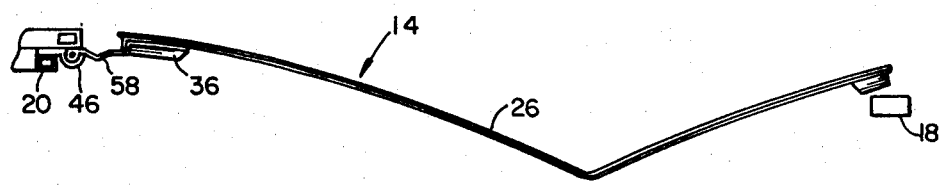
FIG. 4 is a view somewhat similar to FIG. 3 drawn to a smaller scale to illustrate the entire outer door panel when it is subject to a relatively high intrusion force.

When the door panel 14 is subjected to a relatively high inwardly extending force it will bend inwardly. The strips 58 and 60 will unfold or elongate as the relatively strong fibers 45, which do not stretch, extend inwardly with the panel 14. The unfolding or elongation of the deforming members 58 and 60, bending of the panel 14 and band of fibers 44 are illustrated in FIGS. 2, 3 and 4. Only the elements and action relating to hinge 46 will be described, it being understood that a similar action takes place with respect to hinge 48.

Referring to FIGS. 2, 3 and 4, FIG. 2 illustrates the outer panel 14 under a nonimpact condition. Here it is seen that the continuous fibers 45 are inside the molding between the chopped fibers 26. Under these conditions, the strip 58 is folded over upon itself to provide a minimum distance between the hinge 46 and the bracket 54.

With a high impact force applied, the panel 14 starts to intrude into the interior of the car. The band or strap 44 comprising the continuous glass fibers 45, however, is sufficiently strong and does not break. In order to absorb some of the impact force, the strip 58 deforms in the manner illustrated thereby increasing the distance between the hinge 46 and the bracket 54. FIG. 4 illustrates the condition of FIG. 3 wherein the impact is directed somewhat toward the center of the inner panel 14. If the conventional plastic door were used, the chopped glass fibers 26 would tend to shatter and little resistance to the intrusion forces would be present. The force or object causing the force will then enter into the interior of the car resulting in increased damage to the car and possible injury to a driver or passenger.

As previously mentioned, steel beams have generally been used in place of the strap 44. The total weight of the automobile was therefore much higher than when the continuous glass fibers of the present invention is used. In effect, the present invention provides a relatively light but sufficiently strong band which consists of continuous glass fibers in place of metal beams. The glass fibers extend from the hinges to the latch of the door. The door 10 is connected between posts 18 and 20, and are made sufficiently strong so as not to deform when the elements 58 and 60 deform.

The elements 58 and 60 may be omitted in some cases. In these cases, the posts 18 and 20, to which the door is attached, may deform as a result of intrusion forces thereby permitting the glass fiber strap to curve as it absorbs the impact. Deformation of a single one of the posts 18 and 20 may be sufficient to achieve the objects of the invention provided by the glass fiber strap.

The continuous glass fibers in the polyester matrix may have strength in the order of 75,000 psi and higher. As is well known, continuous fibers have little elongations and are quite tough or resilient due to the high strength. The glass fibers are generally available, with one type used being referred to style 1600, 22 oz. per square yard, 8 end warp per inch. The typical thickness of a panel door may be on the order of 0.120 inches. A typical panel door would be between the top and the bottom about 24 inches. The typical width of the strap 44 would be on the order of 8 inches. The number of fibers and precise type of continuous fibers would be dependent upon the particular design and strength involved. Of course, cost would also be a factor. The continuous glass fibers utilized in the present invention is commercially available with one type being available from a company known as Fibreglas Industries, Inc. in Amsterdam, N.Y.

It is recognized that in designing an intrusion resistance door for an automobile that many factors must be considered. Among these factors are the strengths of the various posts involved, as well as the various hinges and other elements. While a wide variety of different designs may be employed, the present invention is primarily directed not to the designs of the other elements but rather to the use of the glass fibers between the hinge and latches. The continuous glass fibers provide a strap which may be integral with the panel 14 as illustrated in FIG. 1 or in some cases may actually be a separate element which is mechanically attached to an outer door panel. The cross-sectional area of the unidirectional strap would be approximately 0.1 square inches. The minimum width of the strap is selected to be 8 inches which is consistent with the current steel intrusion beam widths. At this width, the required unidirectional strap thickness is about 0.0125 inches. Manufacturing problems with these materials would limit the thickness to about 0.060 inches and the strength of the glass fibers with these dimensions is considered to be more than adequate.

Figure 5:
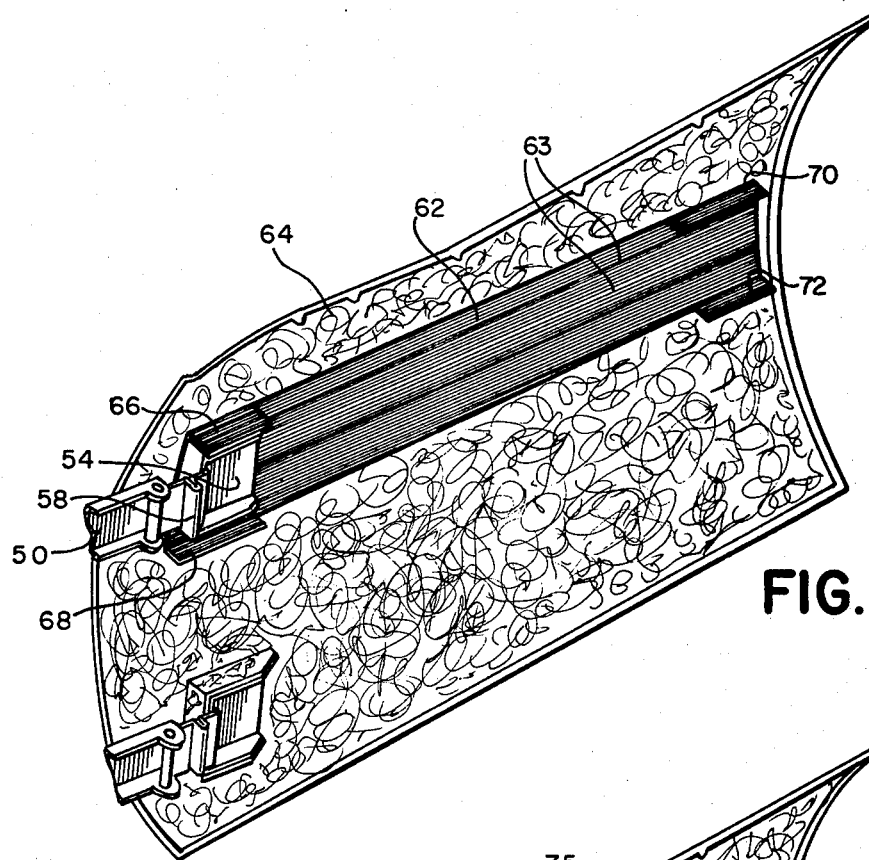
FIG. 5 is a view of an outer panel of a door wherein an intrusion resistance strap is separate from the outer panel.

Referring particularly to FIG. 5, a slightly modified embodiment of the invention is illustrated. In this case a strap 62 forms a separate piece. The strap 62 may comprise a molding made of continuous glass fibers 63 molded with a suitable resin compound in a conventional way. The strap 62 may bonded only to end fittings. The various hinge arrangements including the brackets 54, strip 58 and portion of hinge 50 would be similar to that illustrated in FIG. 1. In the embodiment illustrated in FIG. 5, the strap 62 is slightly narrower than the strap 44 illustrated in FIG. 1, with the connection being made to only a single hinge.

The strap 62 includes protruding elements 66 and 68 to receive the bracket 54 and protruding elements 70 and 72 to provide means for attachment to the latching mechanism (not illustrated).

Figure 6:
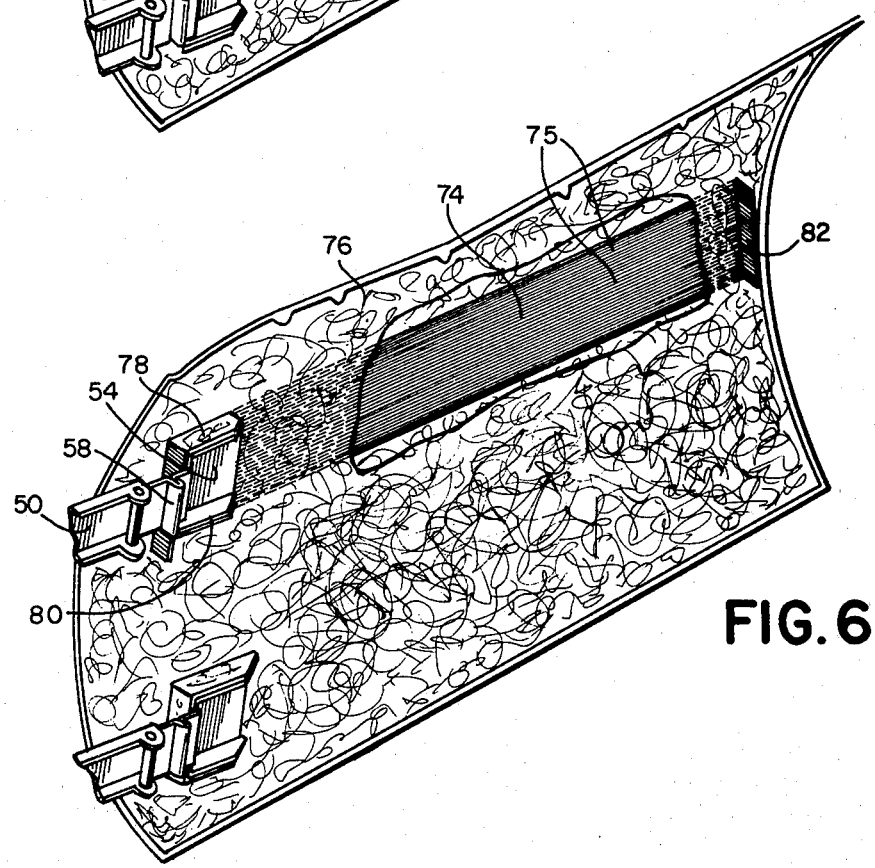
FIG. 6 is another embodiment of an outer panel wherein the intrusion resistance strap is integral with the panel.

Referring particularly to FIG. 6, a similar arrangement to FIG. 5 is illustrated wherein a strap 74 including continuous glass fibers 75 are integral and are molded into the plastic door panel 76. Again the hinge arrangement involving parts 50, 58, and 54 are the same as that illustrated in FIGS. 5 and 1. As mentioned, however, the part 58 may not always be necessary with the associated posts rotating and deforming without using extendible elements. The strap 74 includes extensions 78 and 80 to receive the bracket 54. Extension 82 is provided to permit attachment to the latching mechanism (not illustrated).

It is thus seen that the present invention has provided an improved light strap for a door which is substantially the same strength as a similar steel beam. At the same time, the resulting door may be made much lighter than if a steel beam is used. In one embodiment of the present invention, a standard intrusion beam made of steel was removed. This weighed about 11.3 lbs. When the strap involving the continuous fibers of the present invention was substituted for the standard intrusion beam, a total weight of 3.7 pounds was added. The total weight reduction for a door then amounted to about 7.6 pounds.

What is claimed is:

1. An automobile door having a hinge and a latch mechanism and including inner and outer panels for attachment between two vertical posts in an automobile body comprising:

(a) a hinge and latch mechanism connected to said door;
   (b) a plastic outer panel comprising resin material and chopped glass fibers; and
   (c) a band comprising continuous glass fibers integral with said outer panel in alignment with said hinge and latch mechanism and disposed to extend unidirectionally horizontally between said hinge and latch mechanism and said two vertical posts when said door is attached.

2. An automobile door as set forth in claim 1 wherein said hinge comprises a deformable element having an expandible portion to permit said deformable element to expand when subjected to forces on opposite ends thereof resulting from an intrusion force being applied to said door.

3. An automobile door as set forth in claim 2 wherein said deformable element is connected between said hinge and one of said vertical posts.

4. An automobile door as set forth in claim 3 wherein said expandible portion of said element comprises overlapping sections disposed to unfold when subjected to intrusion forces applied to said door.

5. An automobile door as set forth in claim 4 wherein said band is approximately 8 inches wide with a thickness of about 0.0125 inches.

6. An automobile door as set forth in claim 5 wherein said band is connected to two hinges of said door which are secured to one of said vertical posts.

7. An automobile door as set forth in claim 6 wherein said band includes projections for connecting to said hinges and to an inner panel of said door.

8. An automobile door as set forth in claim 1 wherein at least one of said two vertical posts deforms upon an intrusion impact exceeding a predetermined force against said door to cause said continuous glass fibers of said band to bend inwardly into said automobile.

* * * * *